Figures 1, 2:
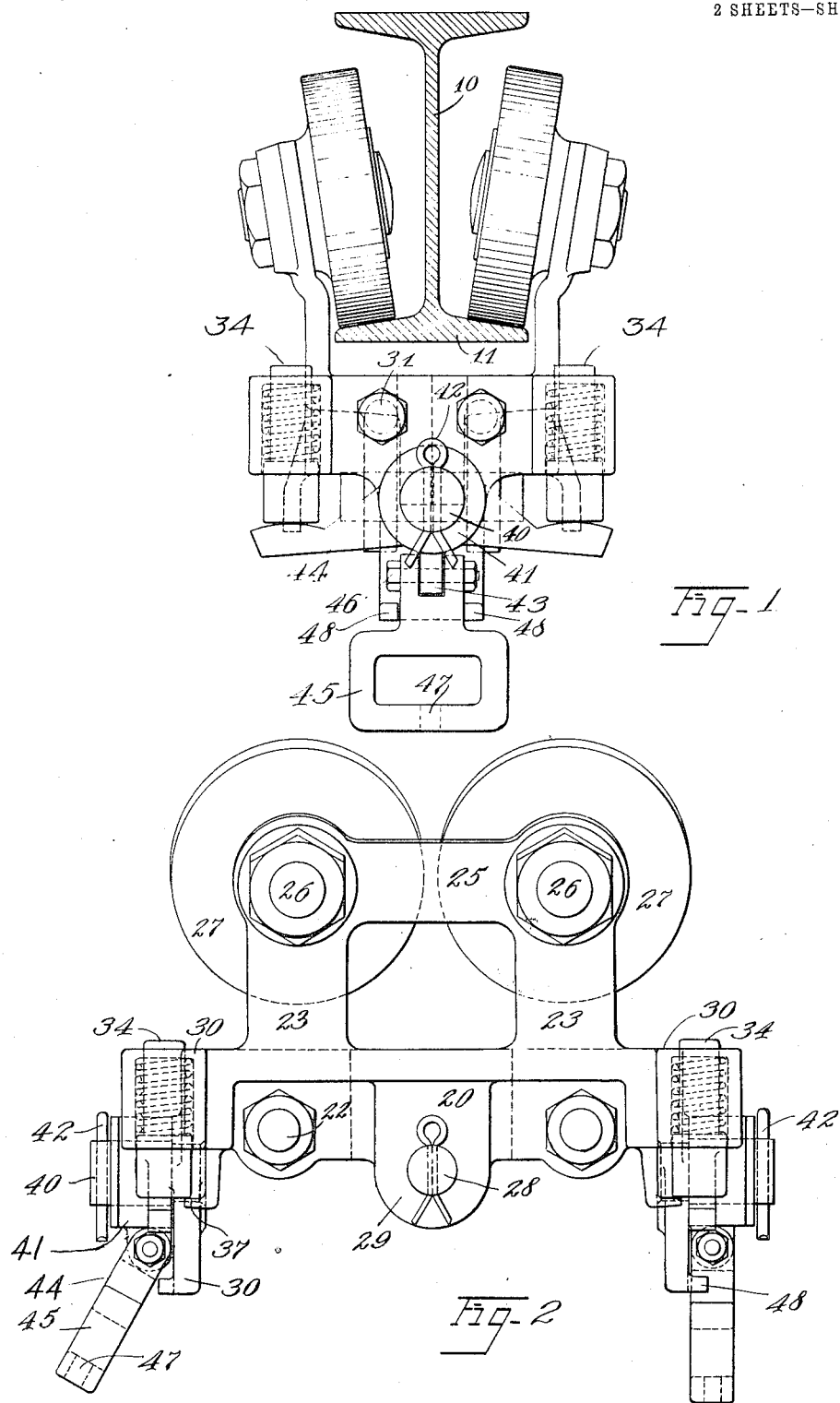

E. Y. MOORE.
TROLLEY.
APPLICATION FILED JAN. 18, 1912.

1,036,505.

Patented Aug. 20, 1912.

2 SHEETS—SHEET 1.

Witnesses:
Arthur S. Remsberg
Brennan B. West

Inventor:
Edward Y. Moore,
By Albert N. Bates, Atty.

E. Y. MOORE.
TROLLEY.
APPLICATION FILED JAN. 18, 1912.

1,036,505.

Patented Aug. 20, 1912.
2 SHEETS—SHEET 2.

Witnesses:
Arthur S. Remsberg.
Brennan B. West.

Inventor:
Edward Y. Moore,
By Albert H. Bates, Atty.

UNITED STATES PATENT OFFICE.

EDWARD Y. MOORE, OF CLEVELAND, OHIO.

TROLLEY.

1,036,505.

Specification of Letters Patent.

Patented Aug. 20, 1912.

Application filed January 18, 1912. Serial No. 671,813.

*To all whom it may concern:*

Be it known that I, EDWARD Y. MOORE, a citizen of the United States, residing at Cleveland, in the county of Cuyahoga and State of Ohio, have invented a certain new and useful Improvement in Trolleys, of which the following is a full, clear, and exact description, reference being had to the accompanying drawings.

This invention relates to trolleys adapted to be propelled on an overhead trackway and the object of the invention is to provide such a trolley with simple and effective means for causing it to take either of a plurality of branches of the trackway, as desired, when it reaches such branch in its travel.

To this end the invention consists broadly of a trolley arranged to travel on an overhead trackway and to support a load, and means mounted on the trolley and adapted to act on the trackway to cause the trolley to select the desired branch.

More particularly, the invention includes movable devices mounted on the trolley frame and provided with an operating handle, whereby they may be thrown, as desired, into position to engage either branch to insure the trolley approaching such track passing onto it in preference to the other branch. Such a combination is valuable in numerous locations, particularly where the track is so high that it can not be conveniently reached from the floor below, and a rope or chain is provided for drawing the trolley along the trackway. In my invention, such rope or chain not only serves this purpose, but may also operate the handle to control the passage onto the desired branch trackway.

Finally, the particular embodiment of the invention illustrated in the drawings hereof for accomplishing the desired result is also comprised within my invention.

Figure 3:
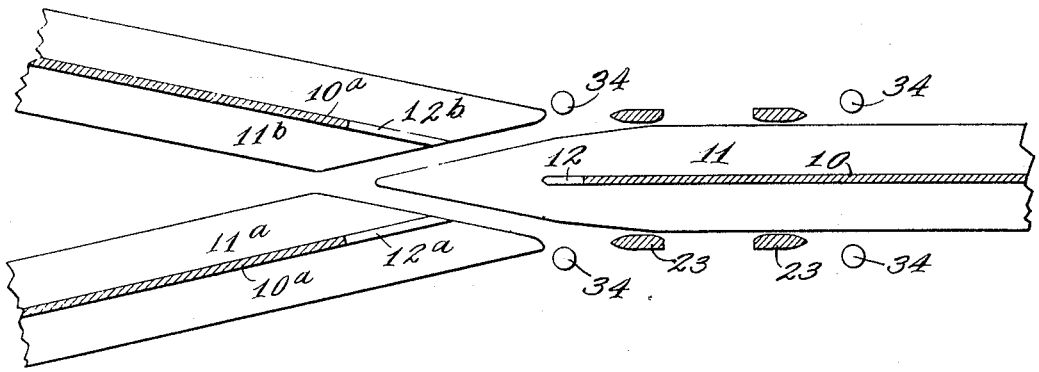
Figure 4:
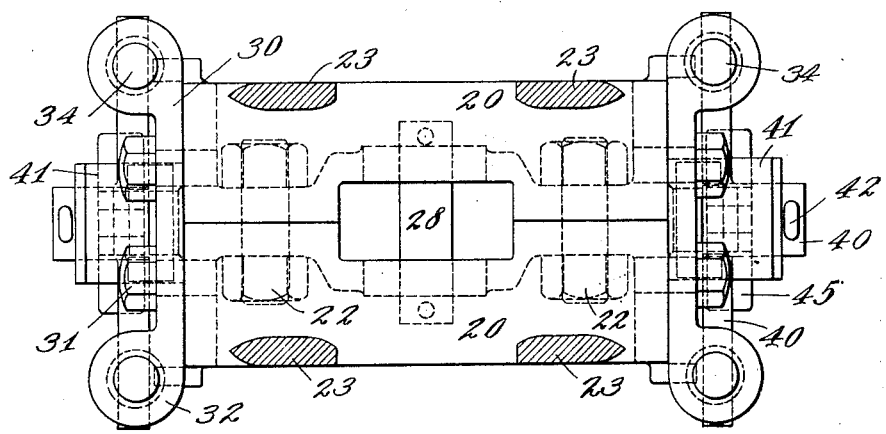

In the drawings, Figure 1 is an end elevation of a trolley equipped with my controlling devices; Fig. 2 is a side elevation of the same; Fig. 3 is a sectional plan of the trackway, illustrating also diagrammatically the trolley and its controlling devices; Fig. 4 is a sectional plan of the trolley, the section being taken through the arms carrying the supporting wheels.

As shown in Figs. 1 and 4, 10 indicates an I-beam, the lower flange 11 of which constitutes a trackway. 20 and 20 indicate the two halves of the trolley frame, these halves being shown as secured together beneath the flange 11 by the bolts 22. Extending upwardly from each half of the trolley frame is a pair of arms, the two arms of the pair being connected by a cross piece 25. The cross piece and arms are shown as made integral with the frame half 20. Mounted in the upper ends of the arms 23 at the junction of the cross portion 25 are studs 26 on which are journaled wheels 27 which ride on the I-beam flange 11. The trolley has suitable means for supporting a load, as, for example, the cross bar 28 mounted in bosses 29 on the frame halves. It is to be understood that the trolley so far described is illustrative of any suitable trolley adapted to travel on the flange 11 and of any suitable means for supporting the load by the trolley. 30 indicates a pair of frame members secured to the opposite ends of the trolley frame proper, the securement being effected in the form shown by the bolts 31. Each member 30 is formed with a boss 32 at its opposite ends, and in these bosses are downwardly opening sockets occupied by plungers 34 and by helical compression springs surrounding the plungers. These springs bear at their upper ends against the top wall of the sockets and at their lower ends against annular shoulders provided by enlarged heads on the plungers. Suitable means limit the downward movement of these plungers, the means shown being lips 37 carried by the trolley frame. Secured to the frame members 30 at the mid position and projecting longitudinally away from the trolley are studs 40 on each of which is mounted a rocking lever 44, which extends beneath the two plungers at that end, the plungers normally resting upon curved upper edges of the lever. The lever has a hub 41 giving it a bearing on the stud, and it is held in place by the cotter pin 42 extending through the stud. Extending downwardly from the hub of the lever is a lug 43 to which is hinged the handle 45, the hinging being shown as accomplished by a bolt 46. The handle is formed with a loop by which it may be conveniently grasped by the hand or by a suitable hook, and also it preferably has an opening 47 to enable a wire or rope to be more conveniently fastened to it. In normal position the handle hangs, as shown in the right hand portion of Fig. 2, with its shank between two lugs 48 formed on the face of a depending portion of the frame 30. These lugs normally lock the handle and lever against movement, but allow the same to be swung when the handle is moved into diagonal position, as shown in the left hand portion of Fig. 2. Normally, the plungers, lever and handle are idle and both plungers are below the plane of the flange 11. When it is desired, however, to guide the trolley onto the branch trackway, the handle 45 (swung longitudinally to release it from the lugs 48) furnishes means by which the lever 40 may be locked to raise either plunger, as desired. Now, with the plunger raised, if the trolley is propelled along the trackway to a junction of branches, the raised plunger will engage the outer side of the corresponding branch trackway and cause the trolley to twist about a vertical axis as it proceeds, so that it runs onto that branch in preference to the other branch.

Fig. 3 illustrates a main trackway and two branches, the main trackway being designated 11 and the branches 11ª and 11ᵇ. All of these trackways are of I-beam construction and the lower flange 11 is shown as brought to a point extending between the flanges 11ª and 11ᵇ, which are cut off diagonally, leaving a space between them and the point for the passage of the arms 23. The main web 10 and the branch webs 10ª and 10ᵇ are cut away, as illustrated at 12, 12ª and 12ᵇ to allow the passage of the trolley wheels and their studs. The arms 23 are preferably pointed at their outer vertical edges to enable them more conveniently to pass into the openings between the point and corresponding branch, and the arms 23 on the side by being separated enable the frame to conveniently pass around the angle where the point leaves the full-width flange 11.

The position of the arms 23 and the plungers 34 are illustrated in Fig. 3, from which it will be apparent that if the left hand lowermost plunger in Fig. 3 is elevated it will engage the outer edge of the trackway 11ª and slide along that edge as the trolley progresses, causing the trolley to travel onto that trackway. On the other hand, if the handle had been rocked in the other direction, the uppermost left hand plunger of Fig. 3 would have been raised and the lowermost plunger idle and the trolley would have taken the trackway 11ᵇ. The plungers at the other end of the trolley are for engagement with switches facing the other direction, not shown.

The handle 45 furnishes convenient means for drawing the hoist along the trackway. In such movement, the handle naturally assumes the diagonal position shown in the left hand portion of Fig. 2, so that a simple rocking of it on the stud 40 in the desired direction insures the trolley taking the proper branch. When the trackway is so high that the handle is out of reach of an operator on the floor, the same result follows when a rope or chain is fastened to the handle. The operator, in dragging the trolley after him by such rope, holds the handle in the diagonal position and simply a side pull on the rope elevates the desired plunger to cause the hoist to take the desired branch track.

Having thus described my invention, what I claim is:

1. The combination, with a trolley having supporting wheels and a frame, of a pair of plungers carried by the frame, and a transverse rocking lever pivoted intermediately on the frame and extending transversely of the plungers and adapted to elevate either into position to engage the outer edge of a corresponding branch trackway.

2. In a trolley, the combination, with a frame, of a member secured to the end of the frame and having a pair of sockets, plungers mounted in said sockets, said member carrying a stud extending longitudinally, and an operating lever pivotally mounted on said stud and extending beneath the plungers.

3. The combination, with a depending trolley having supporting wheels adapted to track on the lower flange of an I-beam, a pair of plungers carried by the trolley and normally below the plane of the supporting trackway, and means on the trolley for elevating either plunger at will to engage the outer edge of the branch I-beam trackway.

4. The combination, with a trolley frame, of a pair of plungers carried thereby, a rocking lever for elevating either plunger at will to coact with the branch trackways, a handle for operating said lever, a lock which the handle normally engages by gravity and from which it is free when the handle is swung longitudinally.

5. The combination, with a trolley having supporting wheels and a frame, of a pair of plungers carried by the frame, a rocking lever pivoted intermediately and extending beneath the plungers and adapted to elevate either into position to engage the edge of a corresponding branch trackway, a handle pivoted transversely on the lever, and a stationary device carried by the frame for locking the handle when in normal position.

6. The combination, with a trolley frame, of a pair of plungers carried thereby, springs tending to depress said plungers, a lever pivotally mounted intermediately and extending beneath the two plungers, and a handle connected with the lever and adapted to rock it in either direction.

7. In a trolley, the combination, with a frame, of a member secured to the end of the frame and having a pair of sockets, plungers mounted in said sockets, said member carrying a stud extending longitudinally, a lever pivotally mounted on said stud and extending beneath the plungers, and means for rocking said lever.

8. In a trolley, the combination, with a frame, of a member secured to the end of the frame and having a pair of sockets, plungers mounted in said sockets, said member carrying a stud extending longitudinally, a lever pivotally mounted on said stud and extending beneath the plungers, a handle pivoted transversely to said lever and normally depending by gravity, a stationary locking member carried by the frame having lugs between which the handle shank normally depends, said shank being free from said lugs when the handle is swung longitudinally.

9. The combination, with a trolley having a frame and supporting wheels, of cross members at the two ends of the frame, each member having two sockets guiding a pair of plungers, and independent levers at the two ends of the frame for elevating either plunger as desired.

10. The combination, with a trolley frame having upwardly extending arms, of wheels carried by the arms adapted to ride on the lower flange of an I-beam, a cross member secured to the end of the frame beneath the I-beam and having near its opposite ends sockets, plungers occupying said sockets, compression springs surrounding the plungers within the sockets and adapted to oppose the raising of the plungers, a lever intermediately pivoted on said cross member and extending beneath the plungers, and means for rocking the lever.

In testimony whereof, I hereunto affix my signature in the presence of two witnesses.

EDWARD Y. MOORE.

Witnesses:
 ROBERT RUBLE,
 CLARENCE PAGE.